Jan. 7, 1969  V. R. KAUFMAN  3,420,042
ENGINE MOUNTING FOR A ROTARY LAWN MOWER
Filed Oct. 24, 1965  Sheet 1 of 2
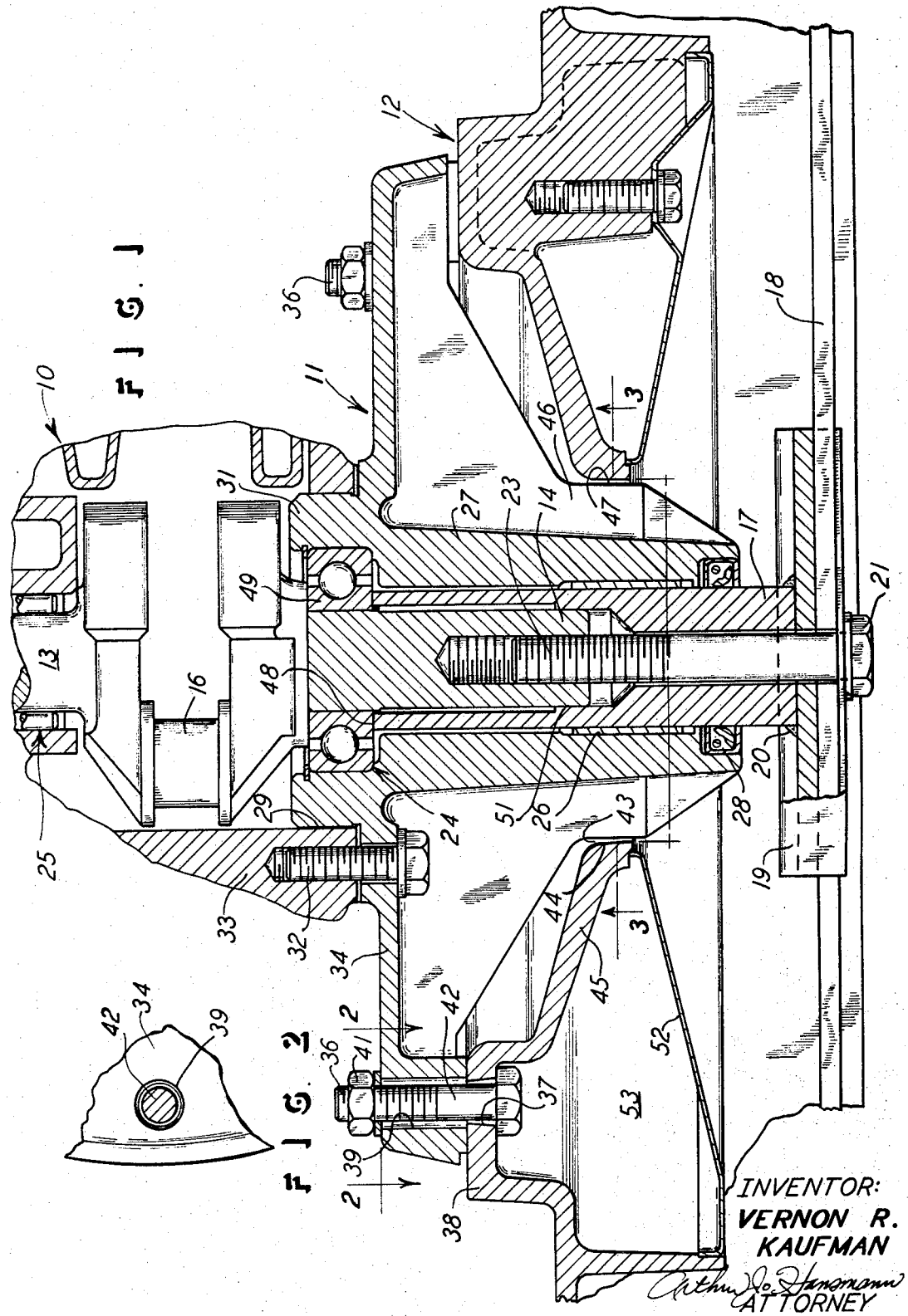
INVENTOR:
VERNON R. KAUFMAN
Arthur Jo. Hansmann
ATTORNEY

United States Patent Office 3,420,042
Patented Jan. 7, 1969

3,420,042
ENGINE MOUNTING FOR A ROTARY LAWN MOWER
Vernon R. Kaufman, Racine, Wis., assignor to Jacobsen Manufacturing Company, Racine, Wis., a corporation of Wisconsin
Filed Oct. 24, 1965, Ser. No. 504,684
U.S. Cl. 56—25.4   5 Claims
Int. Cl. A01d 35/26

ABSTRACT OF THE DISCLOSURE

A lawn mower housing and engine assembly with the engine base slidably mounted on the mower housing. The engine crankshaft extends through the base and the housing and is rotatably supported by means of bearings which have a slight clearance with respect to the mower housing. The clearance betweeen the engine base and the mower housing is less than the amount that the engine base can slide on the housing. Thus when the cutter mounted on the crankshaft engages a foreign object, the engine base slides on the mower housing until it abuts the housing by taking up the clearance between the base and the housing.

---

This invention relates to an engine mounting for a rotary lawn mower, and, more particularly, it relates to a mounting means for the engine of a rotary lawn mower to protect the engine crankshaft, connecting rod, bearings, engine base and assembly from damage upon impact of an object by the cutter.

In the design of a rotary lawn mower, it is commonly known that where the engine crankshaft is on a vertical axis and extends downwardly into the mower housing, the striking of an object by the cutter can bend or even break the crankshaft which may be disposed in a position to absorb the impact. Mower designs have been arranged to avoid damage to the engine and the crankshaft, but these designs have not been fully effective in their intended purpose, nor have they been practical from a manufacturing, strength, and repair standpoint.

Accordingly, it is a general object of this invention to provide an improved arrangement of mounting an engine on a rotary mower housing to avoid damage to the engine and the crankshaft, and other parts, when the mower cutter strikes an object.

Another object of this invention is to provide an assembly of an engine, mounting means therefor, and a rotary mower housing, all three of which may be disassembled from each other, and may also be handled as an entire unit for purposes of replacement, repairs, manufacture, and the like.

Another object of this invention is to provide a mounting for an engine wherein the force of impact of the cutter striking an object will be transmitted directly to the mower housing. To accomplish this, the engine is attached to the housing and piloted thereon. Further, there may be provision for easy manufacture and assembly with consequent support of the crankshaft after a limited displacement of the cutter and attached engine is effected. That is, striking force will be at least partly dissipated in displacing the cutter and the attached engine with respect to the housing, and after a limited displacement and consequent dissipation of a part of the force of impact, then the engine is supported directly by the housing to transfer the force directly to the housing and thereby protect the crankshaft and other engine parts.

Other objects and advantages become apparent upon reading the following description in light of the accompanying drawings, wherein:

FIG. 1 is a vertical sectional view through a preferred embodiment of this invention and showing a fragment of the rotary mower.

FIG. 2 is a sectional view taken on the line 2—2 of FIG. 1 showing a fragment thereof.

Figure 3:
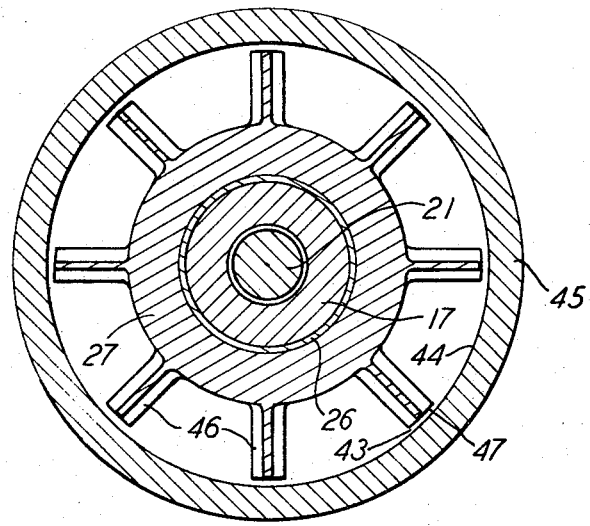
FIG. 3 is a sectional view taken on the line 3—3 of FIG. 1 and showing a fragment thereof.

The rotary mower is shown to include an engine 10 which is fragmentarily shown, and it also includes the engine mounting base 11 and the mower housing 12. The engine 10 includes a crankshaft 13 which extends vertically downwardly into the lower end portion 14, and the crankshaft also has the usual offset portion 16 to which the connecting rod (not shown) is attached.

The crankshaft lower end 14 has a sleeve 17, which can actually rotate thereon, and the lower end of the sleeve supports a cutter 18. The connection between the sleeve 17 and the cutter 18 is accomplished by a connector 19 which is welded at 20 to the sleeve 17, and the connector 19 extends over opposite sides of the cutter 18 and is secured thereto by a screw 21. The screw 21 extends into the crankshaft end 14 and is threaded therein by threads 23. Thus the screw 21 always rotates with the crankshaft end 14, but the cutter 18 can actually rotate with respect to the screw 21, or slip thereon, as will be apparent later.

Of course any other means can be used to connect the crankshaft 14 to the cutter 18, but a clutch is operative between the two elements in a manner hereinafter described.

The engine 10 has main bearings 24 and 25, and the mounting base 11 is disposed between the engine 10 and the mower housing 12 and provides a support for the main engine bearing 24, of the ball bearing type, and another bearing 26, of a bushing or sleeve type. Thus the two bearings 24 and 26 are interposed between the engine crankshaft and the engine mounting base 11. The base 11 is also shown to have a projection or boss 27 which extends into the housing 12 as shown. An engine crankcase seal 28 is interposed between the boss 27 and the sleeve 17.

The engine 10 is mounted on the base 11 by means of a circular opening 29 in the engine and a circular boss 31 on the base. Also, a plurality of screws, such as the shown screw 32, extend between the base 11 and the engine housing 33 to secure the engine 10 to the base 11 in a fixed position. Thus the base 11 has a circular flange portion 34 which forms the bridge between the engine 10 and the mower housing 12.

A plurality of bolts 36, and preferably there are four bolts 36, extend through openings 37 in the mower deck 38 and through enlarged openings 39 in the mounting base flange 34. The bolts 36 receive nuts 41 whioh are tight on the bolts 36 to a desired torque. It will be understood from FIGS. 1 and 2 that the shanks 42 of the bolts 36 are significantly smaller in diameter than the diameter of the openings 39 in the base 11. Thus it will be understood that the base 11, and therefore the engine 10, can shift horizontally with respect to the mower housing 12. The limit of shifting is of course the amount of spacing or clearance between the bolt shanks 42 and the openings 39. Of course there will be resistance to the shifting since the nuts 41 are tightened onto the bolts 36 to a desired degree and will provide a considerable sliding frictional resistance to the horizontal shifting of the base 11 on the housing 12.

The housing 12 has a circular opening 43 defined by a circular wall 44, which is an abutment means with respect to the base 11, and is located in a housing body portion 45. That is, the projection 27 has ribs 46 extending therealong and presenting surfaces 47 which are shown slightly spaced from the wall 44. Of course the boss or projection 27 extends through the opening 43 in the housing 12, and thus the mounting base 11 is free to move horizontally within the limits of clearance between the surfaces 47 and the housing wall 44.

FIG. 3 shows that the projection 27 has a plurality of ribs 46 extending radially outwardly therefrom to be slightly spaced from the mower housing 12 as described. It will also be noted that the engine lower bearing 26 is on the horizontal plane of the abutment surfaces 44 and 47, and this gives the desired support for the crankshaft end 14, particularly when the cutter 18 strikes an object and the force of striking is transmitted to the crankshaft end 14.

When the cutter 18 meets a sufficient force, the base 11 shifts to a position where the surface 47 abuts the surface 44. Of course a portion of the force of impact will be absorbed in shifting the engine base 11 to the point of abutment, and then any remaining force of impact will be transmitted directly to the housing 12. Thus the clearance between the bolts 36 and the mouting base 11 is at least as great as the clearance between the abutment surfaces 44 and 47 so that the shifting of the base 11 can be effected as described. At all times, the crankhaft is not unduly deflected, and the bearings 24 and 25 are also protected.

A clutch is actually provided between the crankshaft end 14 and the cutter 18, and this is by means of the sleeve 17 having its upper surface 48 in frictionally tight contact with the inner race 49 of the main bearing 24. Thus rotation of the inner race 49 along with rotation of the crankshaft end 14 will be frictionally transmitted to the sleeve 17 and thus to the cutter 18. When the cutter 18 strikes an object, the impact may cause the sleeve surface 48 to slip with respect to the bearing inner race 49, and this also protects the crankshaft 13 and the engine 10 from damage.

Further, note that the shaft end 14 and the sleeve 17 are snugly telescoped together at the portion designated 51, and this portion 51 is also shown to be on the horizontal plane of the bearing 26 so that the forces can be directly transmitted between the boss 27, the sleeve 17 and the shaft 14 but without any bending effect on the shaft 14 since the entire base 11 will be displaced horizontally as described. Of course in the normal use of the mower, objects will be struck by the cutter in different positions so the base 11 will actually slide in all radial directions with respect to the crankshaft 13. This is partly true from the fact that the mower will be used in both the forward and rearward directions as well as in turning directions and over low objects, such as partly imbedded stepping stones for instance.

Further note that the aforementioned construction can be accomplished and still have the engine muffler cover attached to the mower housing 12 to define the muffler cavity 53. That is, the mounting described does not interfere with the muffler and the entire full size muffler cavity is still provided in the mower. The engine exhaust from the engine 10 will still be in flow communication with the muffler cavity 53 in the usual and well-known manner, such as in my U.S. Patent No. 3,138,910, even though the base 11 may slide with respect to the housing 12 as the engine base 11 and the housing 12 simply have registering ports which permit a slight displacement of one with respect to the other while retaining gas flow communication between the two.

Thus, there is provided the engine 10 and the base 11 assembly which is mountable on the mower housing 12 to have a horizontal abutment relation between the base and the housing for supporting the engine crankshaft 13. The base 11 is piloted on the housing 12 by projecting through the opening 43 which is made to accommodate the base extension 27 which carries the two bearings 24 and 26. Impact upon the cutter 18 is transferred to the bearing 26 and causes the bearing 24 to act as a fulcrum for the three bearings 24, 25, and 26. This arrangement permits easy manufacture and yet avoids damage to the crankshaft and engine.

While a specific embodiment of this invention has been shown and described, it should be obvious that certain changes could be made in the embodiment and the invention should therefore be determined only by the scope of the appended claims.

What is claimed is:

1. A mounting means for an engine with a vertical crankshaft and disposed on a rotary lawn mower to protect the engine's crankshaft from damage due to impact of the mower cutter against an object, comprising an engine base including an elongated opening and two bearings spaced apart along the axis of said opening for snugly rotatably supporting said crankshaft, means on said base for fixedly mounting said engine thereon, a mower housing including an upper deck and a circular opening co-axial with said elongated opening and being defined by a circular wall vertically spaced below said upper deck, said engine base being bolted to said housing with horizontal clearance to have said engine base horizontally slidable on said housing within limits and with the bolts being tightened to a limited torque, said base including a projection extending into said circular opening and being horizontally spaced from said circular wall with a clearance less than the said sliding limits of said base on said housing, said projection containing the lower one of said two bearings and with said lower one being disposed on the horizontal plane of said circular wall, whereby said base and said engine are horizontally displaced and said projection of said base abuts said circular wall upon impact of an object by said cutter.

2. A mounting means for an engine with a vertical crankshaft and disposed on a rotary lawn mower in a manner to protect the engine's crankshaft from damage due to impact of the mower cutter against an object, comprising an engine base including a projection containing a cylindrical opening and bearings spaced apart along the axis of said opening for snugly rotatably supporting said crankshaft, means on said base for fixedly mounting said engine thereon, a one-piece mower housing having a circular opening defined by a circular wall and being co-axial with said cylindrical opening, said engine base being bolted to said housing to be horizontally slidable thereon and with said projection extending into said circular opening and being horizontally spaced from said circular wall and arranged to abut said circular wall upon impact of an object by said cutter.

3. A mounting means for an engine with a vertical crankshaft and disposed on a rotary lawn mower in a manner to protect the engine's crankshaft from damage due to impact of the mower cutter against an object, comprising an engine base including a projection containing a cylindrical opening and having bearings spaced apart along the axis of said opening for rotatably supporting said crankshaft, a sleeve connected to said crankshaft and disposed intermediate and in snug contact with both the lower one of said bearings and said crankshaft and including means for connecting the cutter thereto, said sleeve being in frictional driving relation with said crankshaft, means on said base for fixedly mounting said engine thereon, a mower housing having a circular opening co-axial with said cylindrical opening and being defined by a circular wall, said engine base being bolted to said housing to be horizontally slidable thereon and with said projection extending into said circular opening and being horizontally spaced from said circular wall and arranged to abut said circular wall upon impact of an object by said cutter.

4. A mounting means for an engine with a vertical crankshaft and disposed on a rotary lawn mower in a manner to protect the egine's crankshaft from damage due to impact of the mower cutter against an object, comprising an engine base including an opening, a bearing disposed in said opening for snugly rotatably supporting said crankshaft, means on said base for fixedly mounting said engine thereon, a mower housing having a horizontal abutment, said engine base being vertically bolted to said housing to be horizontally slidable thereon within limits and in response to at least a minimum force and with said base including a projection surrounding said opening and extending into the horizontal plane of said housing abutment and being horizontally spaced therefrom with a clearance less than said slidable limits of said base on said housing, whereby said base and said engine are horizontally displaced and said projection of said base abuts said housing abutment upon impact of an object by said cutter.

5. A mounting means for an engine with a vertical crankshaft and disposed on a rotary lawn mower to protect the engine from damage due to impact of the mower cutter against an object, comprising a mower housing, an engine base slidably mounted on said housing and including a projection having a vertically disposed elongated opening and two bearings spaced apart along the axis of said opening for snugly rotatably supporting said crankshaft, means on said base for fixedly mounting said engine thereon, said mower housing including a one-piece deck and a circular opening co-axial with said elongated opening and being defined by a circular wall disposed on the horizontal plane of the lower one of said bearings, said projection extending into said circular opening with a slight clearance from said circular wall to be in horizontal abutment with said circular wall upon horizontal sliding displacement of said engine base on said mower housing in response to impact of an object by said cutter.

References Cited

UNITED STATES PATENTS

| | | | |
|---|---|---|---|
| 2,940,241 | 6/1960 | Stahl | 56—25.4 |
| 3,056,249 | 10/1962 | Shaw | 56—25.4 |
| 3,065,589 | 11/1962 | Summerour | 56—25.4 |

ANTONIO F. GUIDA, *Primary Examiner.*

U.S. Cl. X.R.

248—23